United States Patent [19]

Dones

[11] Patent Number: 5,284,123
[45] Date of Patent: Feb. 8, 1994

[54] PRESSURE WAVE SUPERCHARGER HAVING A STATIONARY CELLULAR MEMBER

[75] Inventor: Raymon P. Dones, El Cerrito, Calif.

[73] Assignee: Pulso Catalytic Superchargers, Oakland, Calif.

[21] Appl. No.: 7,718

[22] Filed: Jan. 22, 1993

[51] Int. Cl.⁵ .............................................. F02B 33/00
[52] U.S. Cl. ................................. 123/559.2; 60/605.1
[58] Field of Search ............... 60/598, 605.1, 39.45 A; 123/559.2; 417/64

[56] References Cited

U.S. PATENT DOCUMENTS

| | | | |
|---|---|---|---|
| 2,957,304 | 10/1960 | Berchtold | 60/13 |
| 3,859,788 | 1/1975 | King et al. | 60/280 |
| 4,059,958 | 11/1977 | Heklowski et al. | 60/614 |
| 4,702,075 | 10/1987 | Jenny | 60/274 |
| 4,724,817 | 2/1988 | Cook | 123/565 |
| 4,744,213 | 5/1988 | El-Nashar | 60/39.45 |
| 4,769,993 | 9/1988 | Kawamura | 60/597 |
| 4,808,082 | 2/1989 | Kirchhofer et al. | 417/64 |
| 4,910,959 | 3/1990 | Dones | 60/280 |

FOREIGN PATENT DOCUMENTS

| | | | |
|---|---|---|---|
| 3519543 | 12/1986 | Fed. Rep. of Germany . | |
| 3728189 | 3/1988 | Fed. Rep. of Germany . | |
| 0038119 | 2/1986 | Japan | 123/559.2 |
| 1312264 | 5/1987 | Japan | 417/64 |

OTHER PUBLICATIONS

Zehnder, G., et al., "The Free Running Comprex®," SAE Technical Paper Series, 1989.

Primary Examiner—Richard A. Bertsch
Assistant Examiner—Charles G. Freay
Attorney, Agent, or Firm—Schneck & McHugh

[57] ABSTRACT

A pressure wave supercharger includes a fixed cellular member having an array of parallel longitudinal cells. A segmented impeller fan at a first open end of the cells alternates the cells from being in fluid communication with a supply of fresh air and being in communication with an intake manifold of an internal combustion engine. At the opposite open end of the cells, a segmented turbine fan alternates the cells from being in communication with a supply of exhaust gases and being in communication with a path to the atmosphere. The walls of the cells are coated with a catalytic material, so that the cellular member acts as a catalytic converter substrate. The collision of the exhaust gas with fresh air within the cells and the sonic and positive-pressure pulses compress the fresh air while reversing its direction of flow, whereafter the air is channeled to the engine. The exhaust gases are likewise reversed in direction, expanded, reduced in noise and toxins, and then released into the atmosphere. The impeller fan carries axial flow of fresh air into the substrate cells and radial outflow of compressed air to the engine, while the turbine fan accepts radial inflow of exhaust gas from the engine and carries axial outflow of converted gases from the substrate cells to the atmosphere.

20 Claims, 4 Drawing Sheets

PRESSURE WAVE SUPERCHARGER HAVING A STATIONARY CELLULAR MEMBER

DESCRIPTION

1. Technical Field

The present invention relates generally to pressure wave superchargers and more particularly to superchargers having emission control characteristics.

2. Background Art

Engine boosting systems, such as turbochargers and superchargers, are popular on high performance and sports cars as a means of restoring performance that may have been lost by the addition of modern emissions-control equipment on new vehicles. The systems are able to maximize the power of small engines within current emissions-control regulations.

A turbocharger is a system powered by the residue energy of exhaust gas from a vehicle engine. The turbocharger includes a turbine that is driven by the expansion of exhaust gases derived from air and burned fuel. As the turbine spins, it drives a centrifugal compressor. The compressor provides denser intake air and engine boost. However, there is a time lag in turbocharger-boost production, since it requires a few seconds for the rotating mass of the turbine and compressor wheels and their connecting shafts to acquire the desired speed.

An engine-driven supercharger is a compressor driven by a belt from the engine, rather than being driven by a turbine. This type of supercharger produces increased power and faster acceleration, but requires a significant portion of the engine's net output to drive the compressor.

A pressure wave supercharger, like the turbocharger, utilizes energy from engine exhaust for its operation. There is no appreciable lag, however, since the boost is derived from a gas-to-air pressure exchange process at sonic velocity. Exhaust gases from the engine are directed into one end of a cylindrical rotor having a plurality of axially extending cells. Exhaust gas from the engine is directed into one end of the rotor, while fresh air is directed into the other end. The fresh air is compressed and redirected by the exhaust gases. The compressed fresh air is then channeled to an air intake manifold of the engine. Simultaneously, the exhaust gases are expelled from the rotor by the reflected sonic wave action of the gases, whereupon the exhaust gases are discharged from the vehicle.

The action of the incident and reflected exhaust gas sonic waves are used to compress the fresh air and help expel the exhaust gases before either the fresh air or the exhaust gas can pass completely through the rotor.

For the most part, pressure wave superchargers of the prior art have been limited to use in diesel engines. The use of such superchargers in gasoline engines, particularly rotary engines, has not been prevalent because of the high engine RPM, the high exhaust temperature, and noise suppression requirements, when compared with diesel engine operating characteristics. In addition, the emissions-control requirements for diesel engines have not thus far been as stringent as for gasoline fueled internal combustion engines.

A pressure wave supercharger for internal combustion engines is described in U.S. Pat. No. 4,910,959 to Dones, which is assigned to the assignee of the present invention and is incorporated herein by reference. Dones combines a pressure wave supercharger with a catalytic converter. Catalytic material is used to coat the cell walls of the rotor. The catalytic material causes an exothermic chemical reaction within the exhaust gases, thereby chemically reducing the exhaust products to a less toxic state.

The Dones pressure wave catalytic supercharger provides a number of improvements over the previous superchargers. However, because of the required residence time of the gas, the rotor of the catalytic supercharger typically is larger and therefore heavier than rotors of conventional superchargers. This goes against the trend of designing 400 cells/inch substrates with thinner cell walls to provide lighter rotors which have greater active surface areas and lower rotational masses, but which are more fragile than thick-walled extrusions with fewer cells.

The rotor of the Dones catalytic supercharger at optimal efficiency spins up to nine thousand RPMs and has a rotational mass of approximately 1,500 grams. Because the rotor is relatively large, it must be manufactured to withstand high mechanical stresses. This increases the cost of manufacture.

It is an object of the present invention to provide a pressure wave supercharger which has a reduced rotating mass, but which enhances engine performance using a gas-to-air pressure exchange process in a cost efficient manner and which preferably takes advantage of exothermic chemical expansion to provide further engine boost.

SUMMARY OF THE INVENTION

The above object has been met by a pressure wave supercharger that fixes the "rotor" member in position, so that the "rotor" is not required to withstand stresses exerted by a high speed spin. Rather, it is the input and output flow paths at a fresh air end of a fixed cellular member and the input and output flow paths at an exhaust gas end of the fixed cellular member that are rotated to achieve the desired gas-to-air pressure exchange.

The fixed cellular member replaces the conventional rotor of prior art pressure wave superchargers. The fixed cellular member has an array of cell walls that define a honeycomb of cells open at opposed ends. Preferably, the cell walls have a coating of a catalytic material for controlling the emissions from an internal combustion engine.

At the first ends of the cells is an impeller fan that switches individual cells from a fresh air receiving mode to a charged air release mode. At the opposite end of the cells is a turbine fan that switches the cells between an exhaust gas receiving mode and a catalytically converted gas release mode.

The impeller fan has a plurality of radially extending blades that define pie-shaped segments. First segments are intake segments which have walls that prevent radial flow therefrom. Thus, the first segments are restricted to axial flow. These first segments allow fluid communication between the cells of the fixed cellular member and an intake source of fresh air. Second segments of the blade-divided impeller fan have floors that prevent axial flow. However, radial flow is provided between an intake manifold of the internal combustion engine and cells that are aligned with the second segments. As a result, rotation of the impeller fan alternates individual cells between fluid communication with a source of air and fluid communication with the intake manifold.

The turbine fan is preferably an inverted, mirror image of the impeller fan. First segments of the turbine fan allow axial flow to tailpipes of a vehicle. Second segments of the turbine fan allow radial flow from an exhaust manifold of the internal combustion engine.

The impeller fan and the turbine fan are synchronously rotated, with the impeller fan having a slight lag behind the turbine fan in order to maximize the gas-to-air pressure exchange within the fixed cellular member. The impeller fan and the turbine fan may be linked by a common shaft. The exhaust gas to the turbine fan preferably enters at an angle generally perpendicular to the axis of rotation of the two fans, such that the exhaust gas provides the energy for rotating the two fans. A motor is utilized to initiate rotation and air flow, as well as regulate the speed of the fans.

An advantage of the present invention is that the rotating mass can be reduced from approximately 1,500 grams to less than 200 grams for a two-liter net capacity supercharger wherein both the fresh intake air and the exhausted gases are circulated through the cells containing the catalytic material. Conventionally, catalytic converters only process exhaust gases. The present invention treats the fresh intake air, so that fuel burns more completely and fewer pollutants are generated by the internal combustion engine. Another feature of the present invention is that a three-way-catalyst action can be obtained from the same cells, since there is (1) a nitrous oxide reduction, (2) fresh air injection, and (3) further oxidation of hydrocarbons and carbon monoxide. Another advantage is that the supercharger has a regenerative exhaust-port air-injection design that recirculates some of the heat energy which would otherwise be wasted out of a vehicle tailpipe. This facilitates an earlier cellular member catalytic substrate light-off and provides an increase in low RPM torque, thereby reducing fuel consumption at cruising speeds.

The present invention includes its own motor, so that it needs no drive belt or direct drive from the engine. The motor turns the common shaft of the turbine and impeller fans at approximately 3000 RPM for ignition. The rotational speed then varies with the engine's exhaust energy and is regulated by the electromotive force of the motor.

BEST MODE FOR CARRYING OUT THE INVENTION

Figure 1:
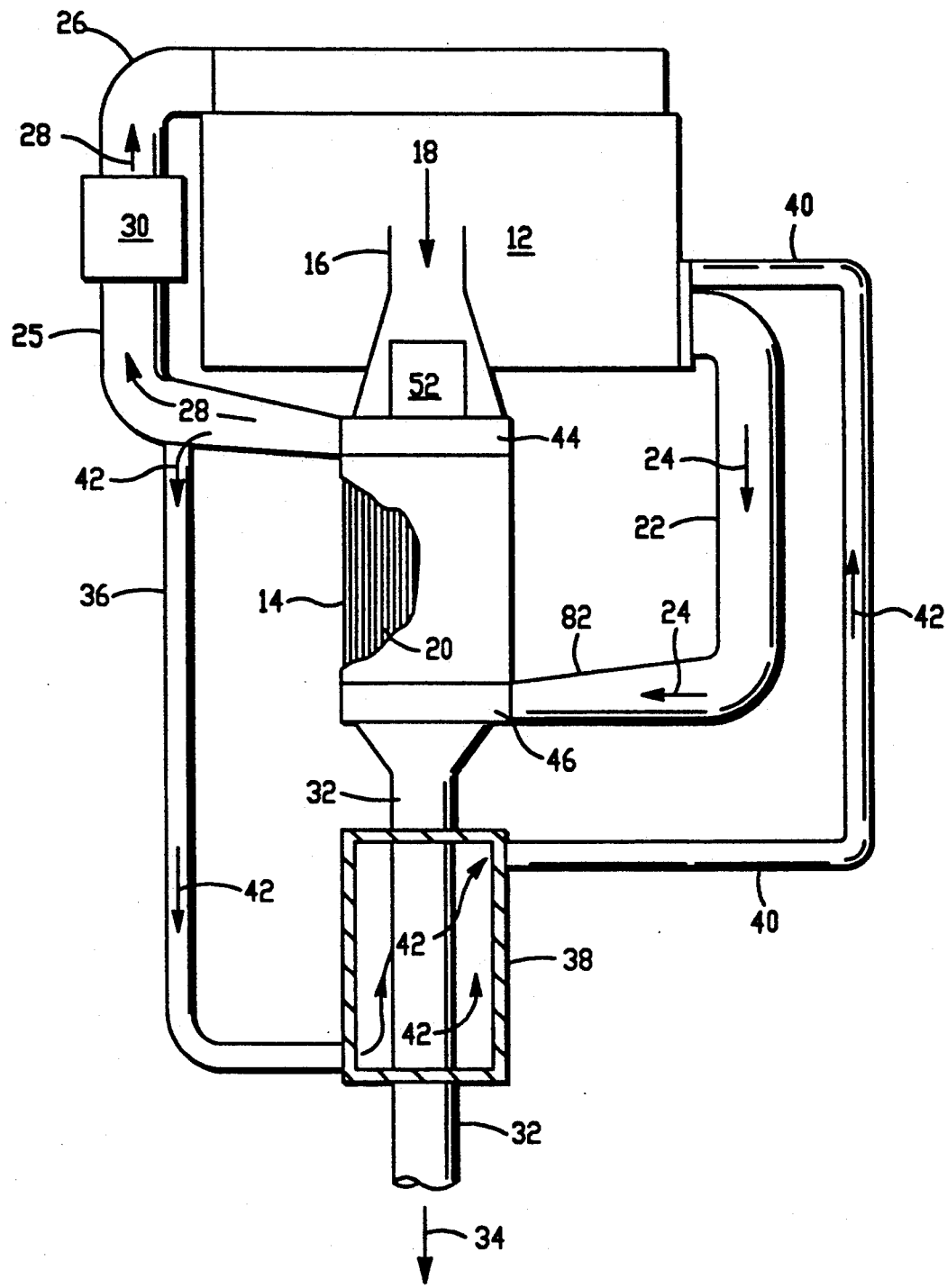
FIG. 1 is a schematic view of a vehicle intake and exhaust system that includes a pressure wave supercharger in accordance with the present invention.

With reference to FIG. 1, a pressure wave supercharger 10 is shown with an internal combustion engine 12. Intake air to a stationary cellular member 14 enters through an intake air conduit 16 as indicated by arrow 18. As will be explained more fully below, the intake air is compressed within substrate cells 20, or channels, that extend through the cellular member 14. Compression occurs by a pressure wave from exhaust gases that flow from an exhaust manifold 22 in the direction of arrows 24 to the substrate cells 20.

As a result of fresh air entering the substrate cells 20 via the conduit 16 at the same time that exhaust gases enter at the opposite ends via the exhaust manifold 22, the intake air reverses its direction and is compressed to flow into an intake manifold 26, as indicated by arrows 28. The compressed, or charged, air flows through an intercooler 30 to various cylinders or rotors of the internal combustion engine 12.

Preferably, the substrate cells 20 of the cellular member 14 have walls which are coated with a catalytic material, such as palladium, platinum, niobium, rhodium or other metallic catalysts or zeolite, $ABO_3$ or other rare earth catalysts. The catalytic material causes an exothermic chemical reaction within the exhaust gases that flow from the exhaust manifold 22.

The exhaust gases contained within the substrate cells 20, after undergoing shear friction and some reductive catalytic conversion, are caused to reverse direction upon impact with intake air. Exhaust gases within the substrate cells undergo further oxidation as the exhaust gases contact intake air and are then discharged through a tailpipe 32 into the atmosphere, as indicated by arrow 34.

Bypass air can be provided to the exhaust port ahead of the manifold 22 from the intake charge-air conduit 25 via a first conduit 36, a heat exchanger 38 and a second conduit 40, as indicated by arrows 42.

Exhaust gases emitted from the internal combustion engine 12 comprise two types of pressure waves. The first type of waves are finite waves, defined as the positive flow pressure wave or pulse traveling at the gas velocity through the exhaust gas manifold 22, but with an acoustic wave velocity superimposed on the finite waves. The gas velocity is less than the velocity of sound. The second type of pressure wave is an acoustic wave, which is defined as that component of the exhaust gas pressure wave traveling at the velocity of sound at the particular operating exhaust gas or intake air temperature. The role of the two types of pressure waves is described fully in U.S. Pat. No. 4,910,959 to Dones, which is assigned to the assignee of the present invention and is incorporated herein by reference.

Figure 2:
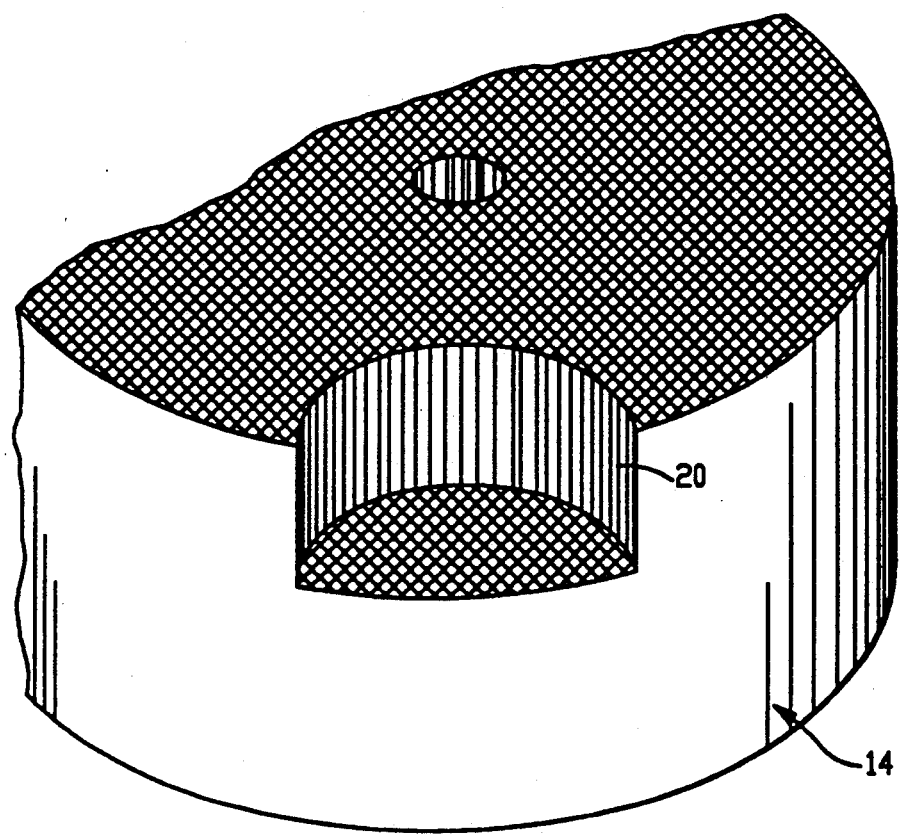
FIG. 2 is a perspective view of a portion of a fixed cellular member of FIG. 1.

Referring now to FIG. 2, an enlarged section of the stationary cellular member 14 is illustrated as having a plurality of triangular, rectangular or hexagonal substrate cells 20, formed by a lattice of cell walls. The dimensions of the cells can vary from 0.05 inch to 0.10 inch in width and are approximately 6.0 inches in length to provide a length-to-width ratio ranging from 120:1 to 60:1. This configuration has been found effective in acting as a waveguide that substantially attenuates audible frequency pressure waves above the frequency of those primary finite waves generated by exhaust valve or port openings. While the substrate cells are shown as being rectangular, the geometry is not critical.

The cellular member 14 is typically manufactured in the same manner as conventional catalytic converter substrates or the extruded rotors of a pressure wave supercharger. The cellular member is a drum-shaped member made of Cordierite, a porous ceramic material distinguished by a low thermal expansion, high absorption of catalytic loading materials and high temperature strength. As exhaust gases enter the substrate cells 20 to contact the catalytic material coating the cell walls, a reduction of nitrous oxide, as well as a rapid expansion of the exhaust gases and further oxidation occur as a result of the catalytic exothermic chemical reaction, thereby reducing prior unburned exhaust gas components to a more stable state. Some shear friction develops, but the velocity of the gases allows most of the minute particles that are ablated by the exhaust gases from the cell walls to enter the intake manifold and further enhance the combustion process.

As shown in FIG. 1, at the opposed ends of the stationary cellular member 14 are an impeller fan 44 and a turbine fan 46. The impeller fan 44 alternates the individual substrate cells 20 between fluid contact with the intake air conduit 16 and the intake manifold 26. Simultaneously, the turbine fan 46 alternates the substrate cells between fluid communication with the exhaust manifold 22 and the tailpipe 32. In a preferred embodiment, the tailpipe 32 is centered relative to the cellular member and the exhaust manifold 22 is connected to conduits 80 and 82 at opposite sides of the tailpipe in order to facilitate driving the turbine fan.

Figure 3:
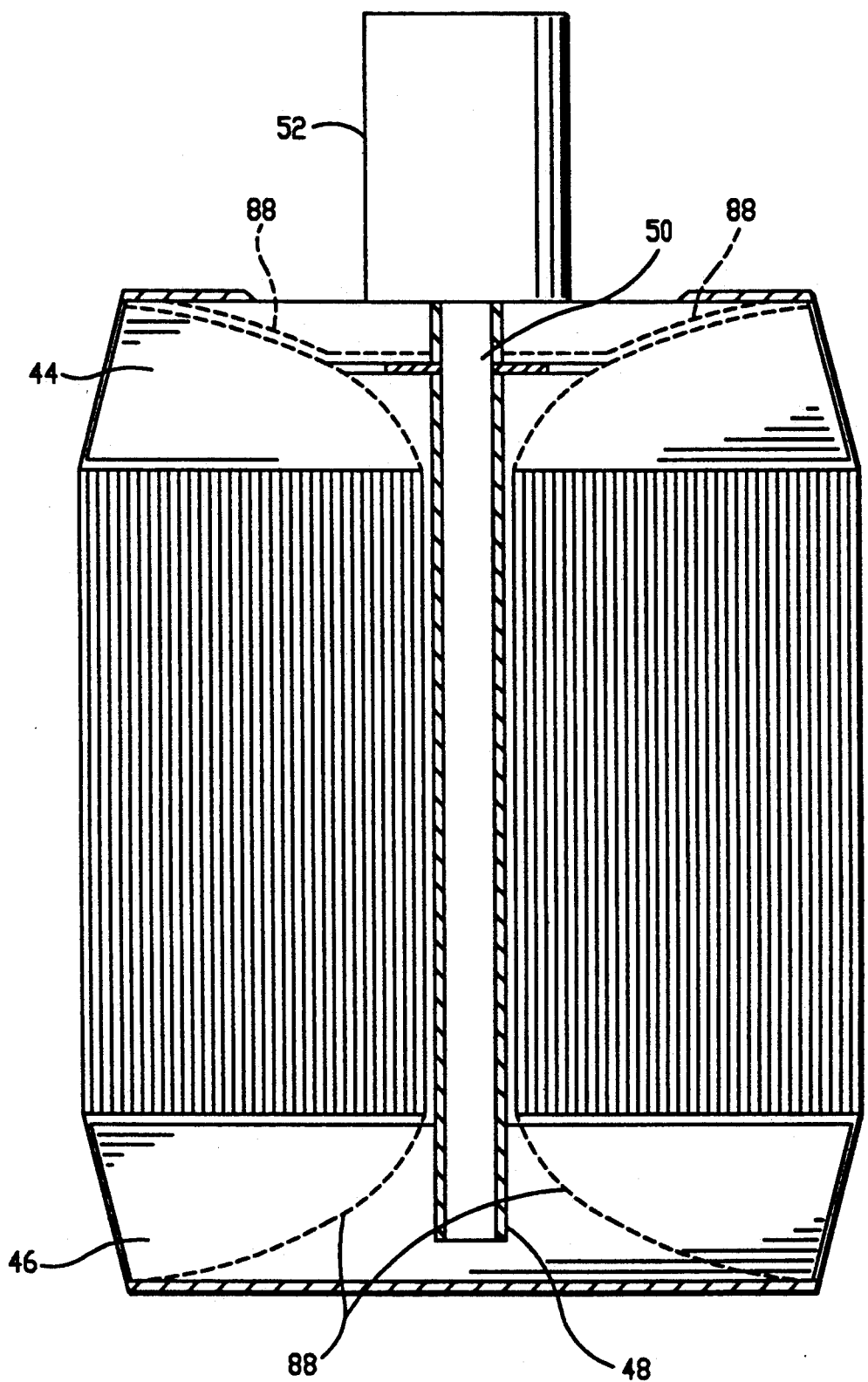
FIG. 3 is a side sectional view of the fixed cellular member of FIG. 2 having an impeller fan and a turbine fan at opposed ends.

As the exhaust gases from the exhaust manifold 22 drive the turbine fan 46, the impeller fan 44 is correspondingly rotated. Referring now to FIG. 3, the turbine fan 46 is linked to the impeller fan 44 by a shaft 48. In the preferred embodiment, the shaft is a hollow member having an inside diameter of 0.25 inch and an outside diameter of 0.375 inch. The shaft is made of alumina. In addition to connecting the turbine and impeller fans, the shaft 48 is connected to a drive shaft 50 of a motor 52. The motor serves two functions. For the ignition of an engine, the motor provides rotation of the fans, so that air can enter the intake manifold to the engine. Following ignition, the exhaust gases drive the fans, but the permanent magnet direct current motor 52 has motor-generator torque characteristics that provide control of the rotation speed of the fans. The impeller and turbine fans 44 and 46 may be frictionally fit or cemented to the alumina shaft 48. However, any connecting hardware can be used to attach the alumina shaft to the fans and to the motor drive shaft 50. FIG. 3 shows use of set screws to secure the fan to the motor drive shaft.

The material for manufacturing the impeller fan 44 is not as critical as the material of the turbine fan 46. The temperature at the fresh air end of the cellular member 14 through which the alumina shaft extends may reach a maximum temperature of 300° C. Even a high temperature plastic material could be damaged by heat soak after the engine has been shut down. The temperature at the end of the cellular member having the turbine fan 46 can exceed 800° C. Silicon nitride may be utilized in manufacturing both the turbine fan and the impeller fan, since they may have identical configurations, as well as the thermal and speed capabilities in excess of need.

Figure 4:
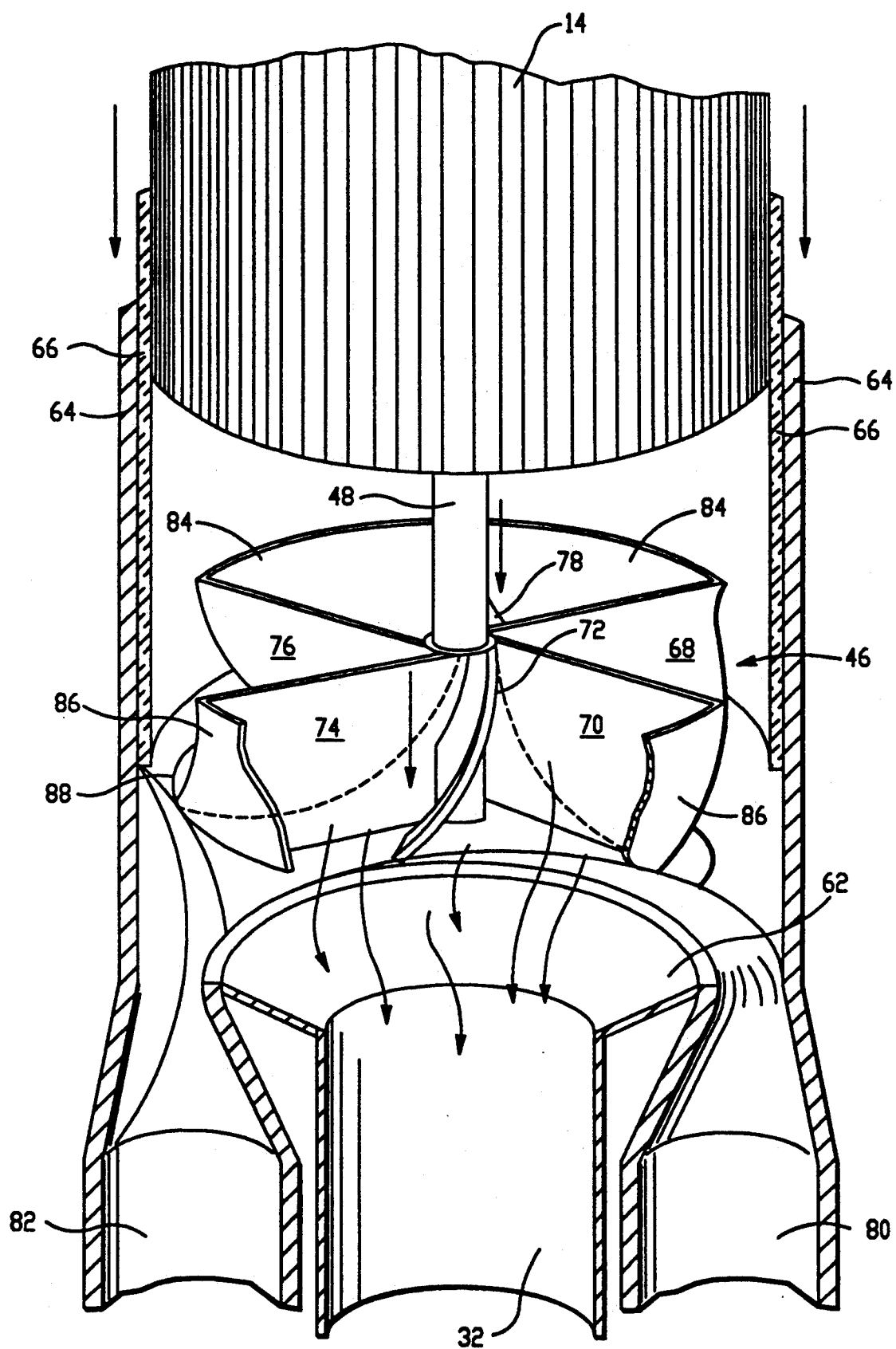
FIG. 4 is a perspective, partially sectional view of the turbine fan and the fixed cellular member of FIG. 3.

In FIG. 4, for clarity the stationary cellular member 14 is shown as being spaced apart from the turbine fan 46, which in turn is shown as being spaced apart from a surface 62 that is normally in closely spaced relation to the turbine fan. The surface 62 may be flared from outward walls 84 and 86 downwardly to conform to the inlet of the tailpipe 32.

The cellular member 14 is fixed in position by an insulating ceramic fiber housing 64. A mounting blanket 66 is sandwiched between the housing and the cellular member.

The impeller fan 44 and the turbine fan 46 include a plurality of radially extending blades 68, 70, 72, 74, 76 and 78. The blades have a curvature that facilitates the rotational drive of the turbine fan 46 by the exhaust gases that enter at conduits 80 and 82. While not shown, the conduits are at an angle of nearly 90° relative to the axis of rotation of the turbine fan, with the gas flow being into a volute in the direction of rotation of the turbine fan.

A radially outward wall 84 extends from blade 76 to blade 78 and continues to blade 68. In an identical manner, a radially outward wall 86 (shown as being cut away for purposes of illustration) extends from blade 70 to 72 and then to blade 74. No radially outward walls extend from the adjacent blades 74 and 76 or the adjacent blades 68 and 70. Thus, a radial flow can occur from the conduits 80 and 82 to the pie-shaped segments defined between blades 68 and 70 and between blades 74 and 76. The walls 84 and 86 prevent such radial flow into the other four pie-shaped segments of the fan.

While the segments between blades 68 and 70 and blades 74 and 76 do not include radially outward walls, these two segments have floors 88 with a curvature to direct radial flow axially to and from the substrate cells 20. In operation, the floors 88 prevent fluid communication between these two segments and the opening to the tailpipe 32. That is, the floors prevent axial flow in two fan segments, while the walls 84 and 86 prevent radial flow to the other four fan segments.

The impeller fan is an inverted mirror image of the turbine fan 46 of FIG. 4. The impeller fan includes the array of four pie-shaped segments having radially outward walls to prevent radial flow and includes the two pie-shaped segments having floors to prevent axial flow. However, the floors of the impeller fan are at the upper extent of the fan blades, since the impeller fan is inverted.

In operation, exhaust gas from an internal combustion engine enters the housing 64 through the conduit 80 and 82. The outside diameter of the turbine fan 46 at its lower extent is significantly less than the inside diameter of the housing 64. As a result, exhaust gases readily flow along the sides of the turbine fan to its upper extent. At that upper extent of the turbine fan, the outside diameter is only slightly less than the inside diameter of the housing 64 and its mounting blanket 66. The radially outward walls 84 and 86 obstruct flow of the entering gases from the four segments associated with these two radially outward walls.

The two segments between blades 74 and 76 and blades 68 and 70 do not include the radially outward walls, thereby allowing the flow of exhaust gases from the conduits 80 and 82 and volute sections into substrate cells of the cellular member 14. The cellular member may include more than 11,000 substrate cells, but only one-third of these cells will be in fluid communication with the conduits 80 and 82 at any one time. As the turbine fan 46 rotates, the third of the vertical substrate cells in communication with the conduits varies sequentially with fan rotation.

The remaining two-thirds of the substrate cells of the cellular member 14 are in fluid communication with the tailpipe 32. While the radially outward walls 84 and 86 obstruct radial flow to the four pie-shaped segments, the lack of a floor leaves the four segments free for axial flow from the substrate cells to the tailpipe. Only those two segments having a floor 88 are blocked from the tailpipe 32.

The impeller fan lags the rotation of the turbine fan 46 by a few degrees (depending upon gas and air temperatures, cell length and rotational speeds) in order to optimize the gas-to-air pressure exchange within the stationary cellular member 14. As the impeller fan rotates, two-thirds of the substrate cells are in fluid communication with an air intake conduit, while one-third is in fluid communication with an intake manifold to the internal combustion engine. Compressed air from the one-third is reversed in direction and is channeled to the intake manifold. The exhaust gases in the same one-third of the substrate cells, while continuing the ongoing exothermic catalytic chemical reaction and having reversed direction by impact with the intake air, are then channeled through the tailpipe 32.

The flow of the exhaust gas is from the conduits 80 and 82 to the one-third of the substrate cells 20 that are aligned with the segments having the floors 88 and described as being a radial flow. While the flow into those substrate cells of the cellular member 14 may include some directional component that is axial in the segments leading into the substrate, the flow associated with the two segments having the floors is still referred to as a radial flow, since it is easily distinguished from the axial flow from substrate cells to the tailpipe 32. Moreover, while the present invention has been described as including a pair of conduits 80 and 82 from the exhaust manifold, embodiments having only one conduit or having more than two conduits are possible, provided that both fans and fan segments are balanced.

The present invention may be utilized with rotary engines, with necessary modifications being within the ability of persons of ordinary skill in the art. The two intake ports of the rotary engine and the two supercharger outlet ports and ducts through the intercooler may be kept separate. The pulse from the exhaust outlet port of one rotor enters the fixed cellular member and exits at a relative time simultaneous with open time of the intake port of the other rotor. Thus, pressure pulses can flow through the open exhaust port and into the open intake port.

Similarly with piston engines, the opening exhaust valve or port generates positive pressure pulses through conduits 80 and 82, through radial segments of turbine fan 46, communicating substrate cells 20, through radial segments of impeller fan 44, separate intercooler 30 and intake manifold 26 sections before each relatively timed intake valve of engine 12 closes.

I claim:

1. A pressure wave supercharger comprising,
   an engine having a pressurized air flow path thereto and having a pressurizing exhaust gas flow path therefrom,
   fresh air intake means for supplying fresh air to be selectively channeled to said pressurized air flow path to said engine,
   exhaust means in fluid communication with the outside atmosphere for selectively discharging gas thereto,
   a stationary cellular member having an axis and having an array of closely spaced parallel channels extending along a length of said stationary cellular member, said channels having axially opposed first and second ends,
   first rotational means rotatably mounted relative to said first ends of said channels for receiving fresh air from said fresh air intake means in an axial direction and for discharging in a substantially radial direction said fresh air into said pressurized air flow path of said engine, wherein rotation of said first rotational means alternates each first end of said channels between generally axial flow from said fresh air intake means and substantially radial flow to said pressurized air flow path,
   second rotational means rotatably mounted relative to said second ends of said channels for radially receiving said gas from said pressurizing exhaust gas flow path of said engine and for axially discharging said gas by way of said exhaust means, wherein rotation of said second rotational means alternates said second ends of said channels between generally radial flow from said pressurizing exhaust gas flow path and generally axial flow to said exhaust means, and
   means for correspondingly rotating said first and second rotational means.

2. The supercharger of claim 1 wherein said first and second rotational means are each fans having a plurality of segments, said fans having coincident axes of rotation parallel to said channels of said stationary cellular member.

3. The supercharger of claim 2 wherein said fan of said second rotational means is a turbine fan having a plurality of generally radial blades to define said plurality of segments, said turbine fan having at least one first segment open to permit axial flow therethrough to said channels, said turbine fan having at least one second segment closed to prevent said axial flow therethrough.

4. The supercharger of claim 3 wherein said first segment is radially enclosed to prevent radial flow thereinto and wherein said second segment is open at a radially outward extent to allow said radial reception of said gas into said second segment.

5. The supercharger of claim 2 wherein said fan of said first rotational means is an impeller fan having first segments in fluid communication with said fresh air intake means and having second segments in fluid communication with said pressurized air flow path of said engine, said impeller fan being coaxial with said stationary cellular member and being disposed to alternate communication of said first and second radial segments with said channels of said stationary cellular member.

6. The supercharger of claim 1 further comprising a motor to initiate initial rotation and regulate speed of said first and second rotational means.

7. The supercharger of claim 1 wherein said channels of said stationary cellular member have catalytic material for reduction and for providing oxidation of exhaust gas components.

8. A pressure wave supercharger comprising,
   an internal combustion engine having at least one air intake and at least one exhaust outlet,
   a fixed cellular member having a longitudinal axis and having cell walls defining an array of axially extending cells open at opposed first and second ends,
   first fan means abutting said cellular member at said first ends of said cells for alternating fluid flow to and from individual cells between a generally axial flow path and a generally radial flow path through said first fan means,
   a fresh air intake means for supplying fresh air to said cells, said fresh air intake means connected to said first fan means for fluid communication with a first path of said generally axial and generally radial flow paths through said first fan means, said air intake of said engine being in fluid communication with a second path of said generally axial and generally radial flow paths through said first fan means, a second fan means abutting said cellular member at said second ends of said cells for alternating fluid flow to and from individual cells between a generally axial flow path and a generally radial flow path through said second fan means, and exhaust means for discharging gas from said cells, said exhaust means connected to said second fan means for fluid communication with a first path of said generally axial and generally radial flow paths through said second fan means, said exhaust of said engine being in fluid communication with a second path of said generally axial and generally radial flow paths through said second fan means.

9. The supercharger of claim 8 further comprising a motor for initiating air flow and for regulating rotational speed of said first and second fan means.

10. The supercharger of claim 8 wherein said first and second fan means are joined by a rotatable shaft to provide corresponding rotation of said first and second fan means.

11. The supercharger of claim 8 wherein each of said first and second fan means includes a fan having radial blades defining a circular array of segments, with first segments being unobstructed with respect to axial flow and with second segments being obstructed with respect to axial flow therethrough.

12. The supercharger of claim 11 wherein said first segments have outer walls connecting adjacent radial blades.

13. The supercharger of claim 12 wherein said second segments have floors connecting adjacent radial blades.

14. The supercharger of claim 8 wherein said cells are coated with a catalytic material.

15. The supercharger of claim 11 further comprising channeling positive pressure pulses from open exhausts through said first segments of said first and second fan means and into open intakes.

16. A pressure wave supercharger comprising,
a fresh air intake path,
an impeller fan having a circular array of flow chambers, said impeller fan having a geometry defining a first type of flow chamber which restricts flow to a generally radial direction therethrough, said geometry of said impeller fan defining a second type of flow chamber which restricts flow to a generally axial direction therethrough, said fresh air intake path being in fluid communication with at least one of said second type of flow chamber,
a cellular member having an array of parallel cells walls to define cells having first and second ends, said cellular member aligned coaxially with said impeller fan such that flow to and from said cells via said first ends is through said first and second types of flow chambers of said impeller fan,
an engine having a charged air port in fluid communication with at least one of said first type of flow chamber, said engine having an exhaust port,
a turbine fan having a circular array of flow chambers, said turbine fan coaxially aligned with said cellular member at said second ends of said cells, said turbine fan having a geometry defining a third type of flow chamber such that flow is limited to a generally radial direction therethrough, said geometry of said turbine fan defining a fourth type of flow chamber such that flow is limited to a generally axial direction therethrough, said exhaust port of said engine being in fluid communication with at least one of said third type of flow chamber,
an exhaust path in fluid communication with at least one of said fourth type of flow chamber, and
means for linking said turbine and impeller fans for corresponding rotation.

17. The supercharger of claim 16 wherein said turbine fan has a plurality of third and fourth types of flow chambers and wherein said impeller fan has a plurality of first and second types of flow chambers.

18. The supercharger of claim 16 wherein said cell walls have a catalytic material thereon.

19. The supercharger of claim 16 further comprising a motor for initially accelerating as well as for regulating rotational speed of said impeller and turbine fans.

20. The supercharger of claim 16 wherein said engine is an internal combustion engine.

* * * * *